(12) United States Patent
Schmöller et al.

(10) Patent No.: US 8,997,367 B2
(45) Date of Patent: Apr. 7, 2015

(54) LENGTH MEASURING INSTRUMENT

(71) Applicant: Dr. Johannes Heidenhain GmbH, Traunreut (DE)

(72) Inventors: Markus Schmöller, Traunstein (DE); Michael Steber, Ruhpolding (DE); Yusuke Kitano, Tokyo (JP)

(73) Assignee: Dr. Johannes Heidenhain GmbH, Traunreut (DE)

( * ) Notice: Subject to any disclaimer, the term of this patent is extended or adjusted under 35 U.S.C. 154(b) by 179 days.

(21) Appl. No.: 13/778,686

(22) Filed: Feb. 27, 2013

(65) Prior Publication Data

US 2013/0227853 A1  Sep. 5, 2013

(30) Foreign Application Priority Data

Mar. 1, 2012 (DE) .......................... 10 2012 203 220

(51) Int. Cl.
*G01B 7/14* (2006.01)
*G01B 11/14* (2006.01)
*G01B 5/02* (2006.01)
*G01D 5/347* (2006.01)

(52) U.S. Cl.
CPC .............. *G01B 5/02* (2013.01); *G01D 5/34761* (2013.01)

(58) Field of Classification Search
USPC ........................................... 33/706, 707, 708
See application file for complete search history.

(56) References Cited

U.S. PATENT DOCUMENTS

| | | | | |
|---|---|---|---|---|
| 4,320,578 A * | 3/1982 | Ernst ............................ | 33/702 |
| 4,340,814 A | 7/1982 | DiCiaccio et al. | |
| 4,982,508 A * | 1/1991 | Nelle et al. ....................... | 33/702 |
| 5,016,359 A * | 5/1991 | Nagaoka et al. ................ | 33/702 |
| 5,079,850 A | 1/1992 | Rieder et al. | |
| 5,258,931 A * | 11/1993 | Hassler, Jr. .................... | 702/105 |
| 5,793,201 A * | 8/1998 | Nelle et al. ............... | 324/207.14 |
| 5,832,616 A * | 11/1998 | Fiedler ............................ | 33/706 |
| 5,837,981 A * | 11/1998 | Wang ........................ | 235/70 R |
| 6,739,067 B2 * | 5/2004 | Muller ............................ | 33/703 |
| 7,096,595 B2 * | 8/2006 | Greubel ......................... | 33/706 |
| 8,234,792 B2 * | 8/2012 | Schenk et al. .................. | 33/706 |
| 2003/0200671 A1* | 10/2003 | Muller ............................ | 33/706 |
| 2004/0154181 A1* | 8/2004 | Nakamura et al. ............. | 33/706 |
| 2013/0227852 A1* | 9/2013 | Schmoller et al. ............. | 33/706 |

FOREIGN PATENT DOCUMENTS

EP            0 418 212 A2     8/1990

* cited by examiner

*Primary Examiner* — Christopher Fulton
(74) *Attorney, Agent, or Firm* — Brinks Gilson & Lione

(57) ABSTRACT

A length measuring instrument that includes a hollow profile section extending in a longitudinal direction, wherein the hollow profile section includes a slot extending in the longitudinal direction and covered by sealing elements. A scale is disposed inside the hollow profile section, wherein the scale includes a measurement graduation which can be scanned by a scanning unit. An end piece is connected to the hollow profile section, wherein the end piece closes the hollow profile section on an end of the hollow profile section, the end piece including an insertion region with which the hollow profile section plunges into the hollow profile section. The length measuring instrument includes a clamping piece that connects the end piece to the hollow profile section, wherein the clamping piece spans the slot and which on two sides of the slot fixes the hollow profile section to the insertion region of the end piece.

18 Claims, 5 Drawing Sheets

LENGTH MEASURING INSTRUMENT

RELATED APPLICATIONS

Applicants claim, under 35 U.S.C. §119, the benefit of priority of the filing date of Mar. 1, 2012 of a German patent application, copy attached, Serial Number 10 2012 203 220.7, filed on the aforementioned date, the entire contents of which is incorporated herein by reference.

BACKGROUND

1. Technical Field

The present invention relates to a length measuring instrument.

2. Background Information

Such length measuring instruments are known as encapsulated length measuring instruments, and they serve to measure the position of two objects that are displaceable relative to one another. Encapsulated length measuring instruments are used especially in machining machines for measuring the relative motion of a tool relative to a workpiece that is to be machined.

Such length measuring instruments are described in European Patent Disclosure 0 418 212 A2 and U.S. Pat. No. 4,340,814, for example. Each of the length measuring instruments include a U-shaped hollow profile section with two legs extending parallel to one another, a base, and a slot-like opening facing the base and extending in the longitudinal direction. This opening is covered by sealing elements. Both a scale and a scanning unit are disposed inside the hollow profile section, and for position measurement, the scanning unit can be displaced in the longitudinal direction relative to the scale. The scanning unit has a sword-shaped driver extending through the sealing lips to the outside. The face ends of the hollow profile section are each closed with an end piece, which is also embodied for mounting the hollow profile section on one of the objects to be measured. The end piece has an insertion region, with which it plunges into the inside of the opening in the hollow profile section. In the length measuring instruments of the prior art, the connection between the hollow profile section and the end piece is made by screwing or pinning the lateral legs of the U-shaped hollow profile section to the insertion region.

OBJECTS AND SUMMARY OF THE INVENTION

An object of the present invention is to disclose a length measuring instrument of compact design, with which replicable position measurements can be performed.

This object is attained by a length measuring instrument that includes a hollow profile section extending in a longitudinal direction, wherein the hollow profile section includes a slot extending in the longitudinal direction and covered by sealing elements. The length measuring instrument includes a scale disposed inside the hollow profile section, wherein the scale includes a measurement graduation which for position measurement can be scanned by a scanning unit that is movable in the longitudinal direction relative to the hollow profile section. An end piece is connected to the hollow profile section, wherein the end piece is structured to close the hollow profile section on an end of the hollow profile section and for mounting on an object to be measured, the end piece including an insertion region with which the hollow profile section plunges into an interior of the hollow profile section. The length measuring instrument further includes a clamping piece that connects the end piece to the hollow profile section, wherein the clamping piece spans the slot and which on two sides of the slot fixes the hollow profile section to the insertion region of the end piece.

The length measuring instrument embodied according to the present invention includes a longitudinally extending hollow profile section, which has a slot extending in the longitudinal direction and covered by sealing elements. Inside the hollow profile section, a scale with a measurement graduation is disposed, which for position measurement can be scanned by a scanning unit that is movable longitudinally relative to the hollow profile section. The hollow profile section is detachably connected to at least one end piece, which closes off the hollow profile section on the end. The end piece is also embodied for mounting the hollow profile section on an object to be measured. For orienting the end piece in the hollow profile section and securing the end piece to the hollow profile section, the end piece has an insertion region with which it plunges into the interior of the hollow profile section. The stationary connection between the end piece and the hollow profile section is effected by a clamping piece, which spans the slot in the hollow profile section and fixes the hollow profile section, on both sides of the slot, to the insertion region of the end piece.

The hollow profile section is designed as being U-shaped in particular, and it has two legs extending parallel to one another and a base joining the legs. The slot of the hollow profile section is disposed facing the base. Protrusions pointing in the direction of the slot are disposed on the two legs, and in particular are formed integrally onto the legs.

The clamping piece is screwed to the end piece, and the two protrusions of the hollow profile section are thereby pressed against the insertion region of the end piece and fixed thereon. The stationary connection between the end piece and the hollow profile section is thus effected by clamping the protrusions in place between the clamping piece and the insertion region of the end piece.

Further advantages and details of the present invention will become apparent from the ensuing description of exemplary embodiments in conjunction with the drawings.

DETAILED DESCRIPTION OF THE PREFERRED EMBODIMENTS

Figure 1:
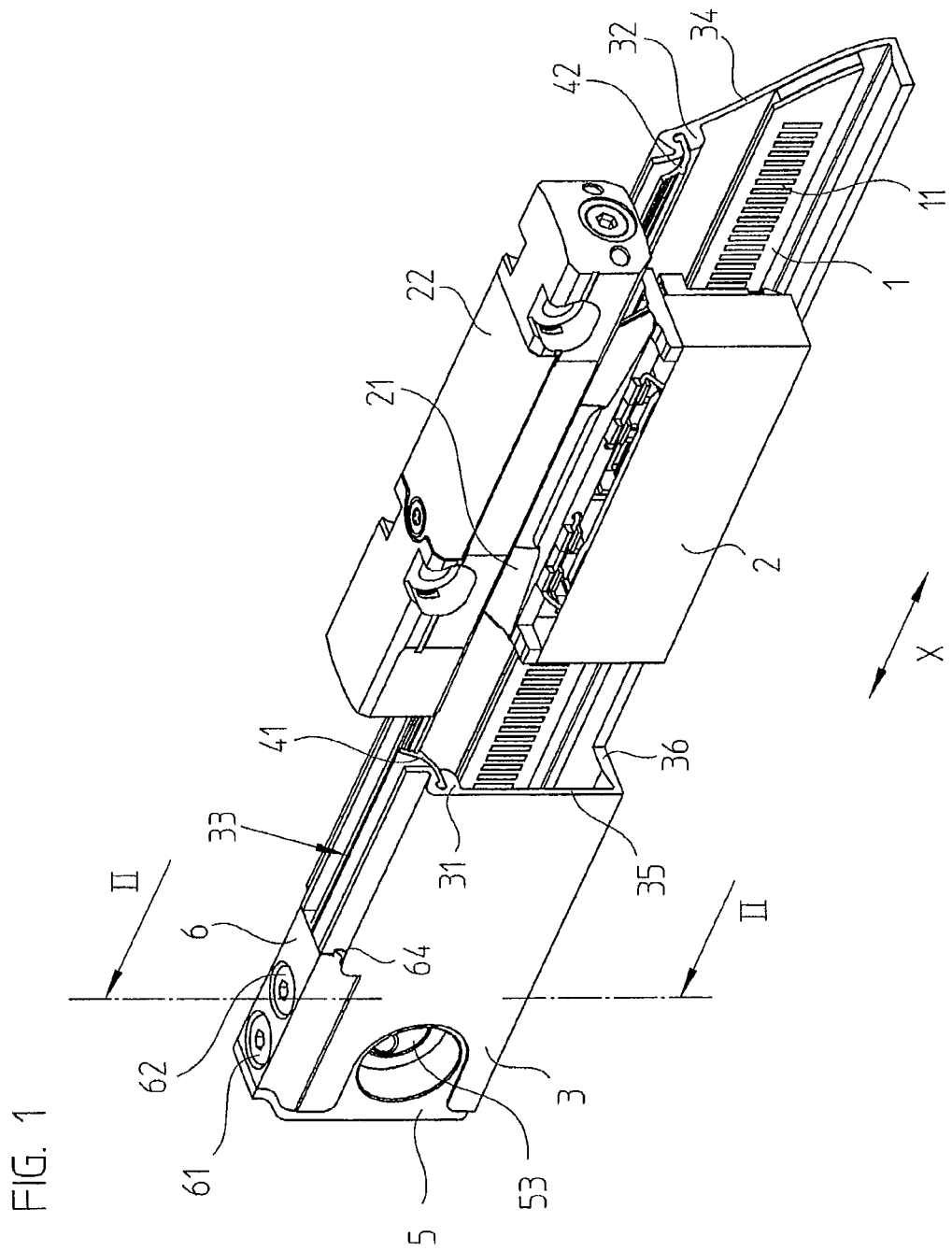
FIG. 1 shows an embodiment of a length measuring instrument in fragmentary section in accordance with the present invention.

The present invention will be described in detail in terms of a photoelectric length measuring instrument. This length measuring instrument, shown in fragmentary section in FIG. 1, includes two components, a scale 1 and a scanning unit 2, that are movable relative to one another in the longitudinal direction X. For measuring a position of two objects displaceable relative to one another in the longitudinal direction X, the scale 1 is secured to one of these objects, and the scanning unit 2 is secured to the other of these objects. During position measurement, the scanning unit 2 scans a measurement graduation 11 of the scale 1 and forms position measurement values from such scanning. The measurement graduation 11 may be embodied as an incremental track with a succession of uniformly spaced markings, as a multi-track absolute code or as a single-track absolute code with absolute coding in the longitudinal direction X, such as pseudo-random coding. The present invention is not limited to the photoelectric scanning principle; the measurement graduation can also be designed to be scannable inductively, magnetically, or capacitively.

The scale 1 is accommodated in protected fashion in a hollow profile section 3 extending in the longitudinal direction X. The scale 1 is secured to the hollow profile section 3 by being fixed, for instance, to an inner side of the hollow profile section 3, in particular by an adhesive. The hollow profile section 3 has a slot 33, extending in the longitudinal direction X, which is covered by gable-shaped, lip-like sealing elements 41, 42. Protruding through the sealing elements 41, 42 is a sword-shaped driver 21, to which the scanning unit 2 is secured. A mounting element 22 is disposed outside the hollow profile section 3 and is designed to be secured to one of the two objects to be measured, for instance by being screwed to it.

Figure 2:
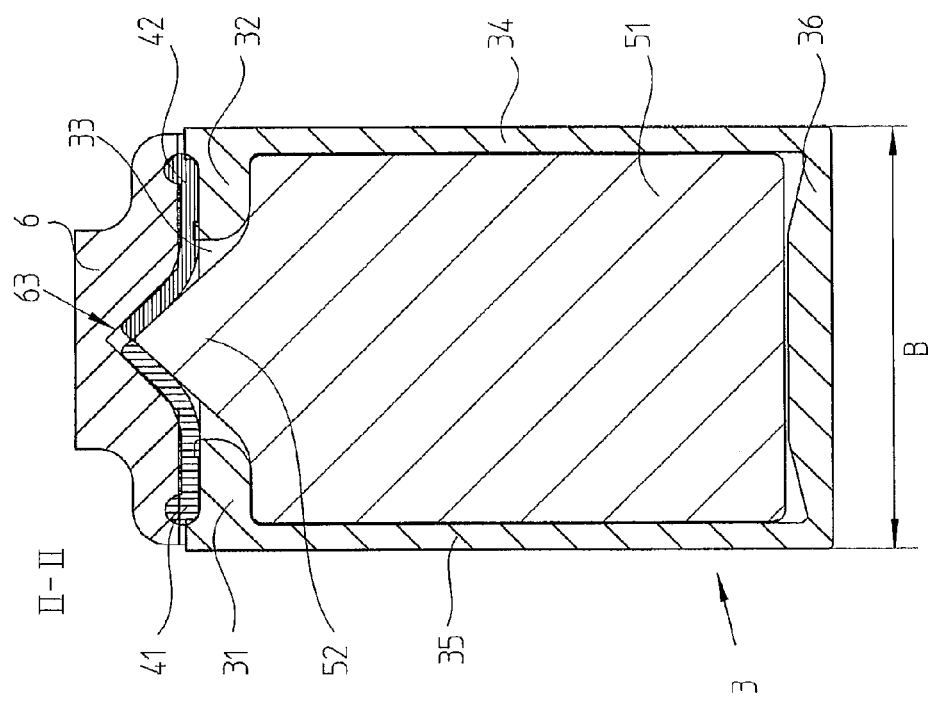
FIG. 2 is a cross-section II-II through the length measuring instrument of FIG. 1.
Figure 3:
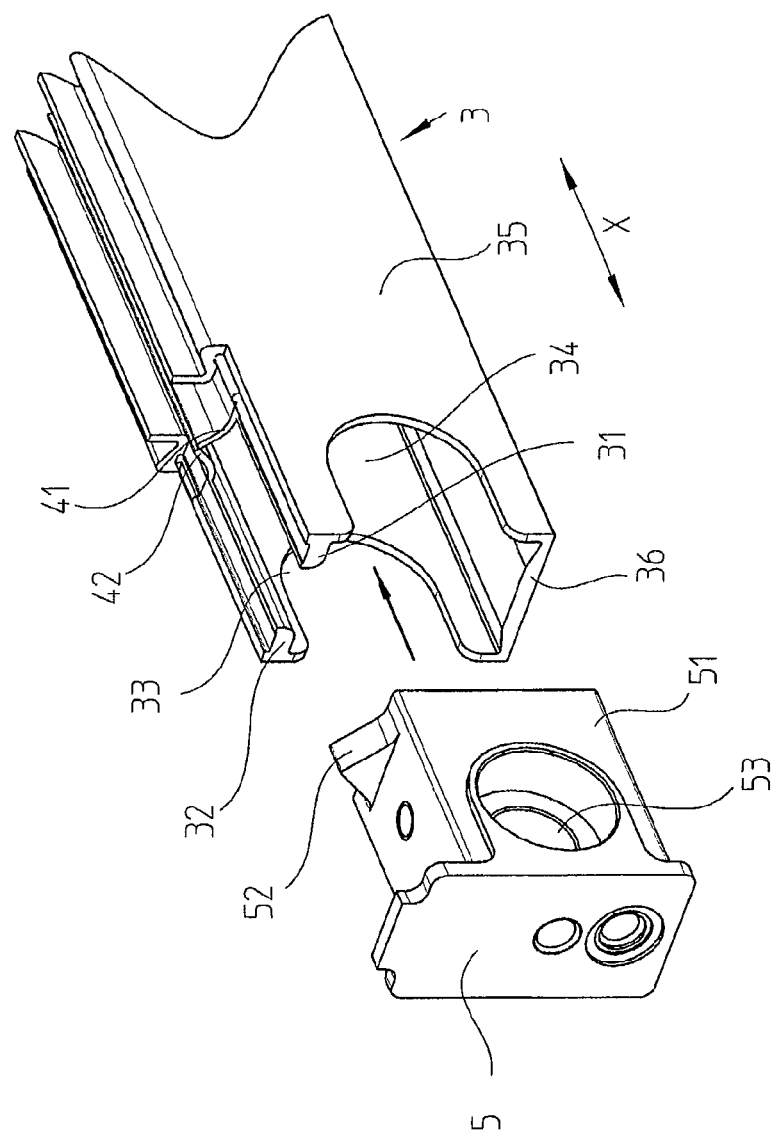
FIG. 3 is a perspective view of the length measuring instrument of FIG. 1 in a first possible assembly position.

As shown in FIGS. 2 and 3, the hollow profile section 3 is embodied as being U-shaped and has two parallel-extending legs 34, 35 and a base 36 joining the two legs 34, 35. The slot 33 is disposed facing the base 36 and is bounded by two protrusions 31, 32 that are integrally formed onto the legs 34, 35 of the hollow body 3.

The two face ends of the hollow profile section 3 are each closed off with a respective end piece 5, only one of which is shown. The end piece 5 has an insertion region 51, with which the end piece 5 plunges into the interior of the hollow profile section 3. This insertion region 51 is shown in FIG. 3. The cross-section of the insertion region 51 is adapted to the cross-section of the hollow profile section 3 in such a way that the inside faces of the two legs 34, 35 and the inside face of the base 36 rest on the side faces of the insertion region 51. Thus, the outer contour of the insertion region 51 corresponds to the inner contour of the hollow profile section 3.

The end piece 5 is embodied for mounting on one of the two objects to be measured. For that purpose, the end piece 5 has a bore 53 for a securing screw or for a bolt. Instead of the bore, an angle piece, a bolt, or a ball, with which the hollow profile section can be secured to the object to be measured, may be disposed on the end piece in a known manner.

Figure 4:
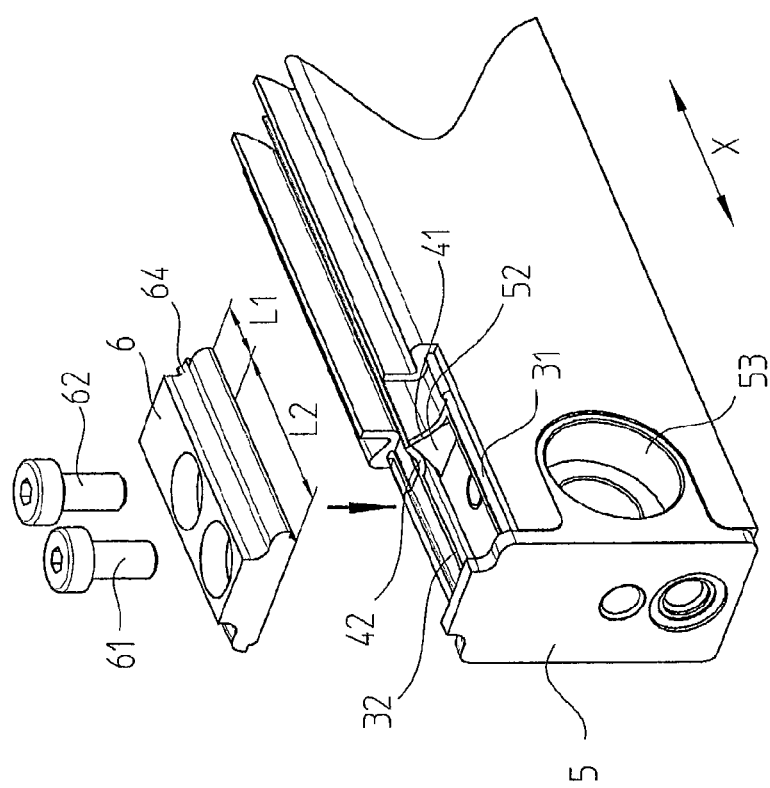
FIG. 4 is a perspective view of the length measuring instrument of FIG. 1 in a second possible assembly position.

FIG. 3 shows an assembly position in which the end piece 5 is thrust by its insertion region 51 into the hollow profile section 3. In a further assembly step, the end piece 5 is secured to the hollow profile section 3, as shown in FIG. 4. The stationary fixation of the end piece 5 on the hollow profile section 3 is effected by a clamping piece 6. The clamping piece 6 is embodied for spanning the slot 33 and for pressing the two protrusions 31, 32 against a face of the insertion region 51 of the end piece 5 and fixing them there by non-positive engagement. For that purpose, the clamping piece 6 is screwed to the end piece 5, for instance by two screws 61, 62 shown in FIG. 4. The two protrusions 31, 32 facing the base 36 are thus clamped in place between the clamping piece 6 and the insertion region 51 and thereby fixed in stationary fashion.

Figure 5:
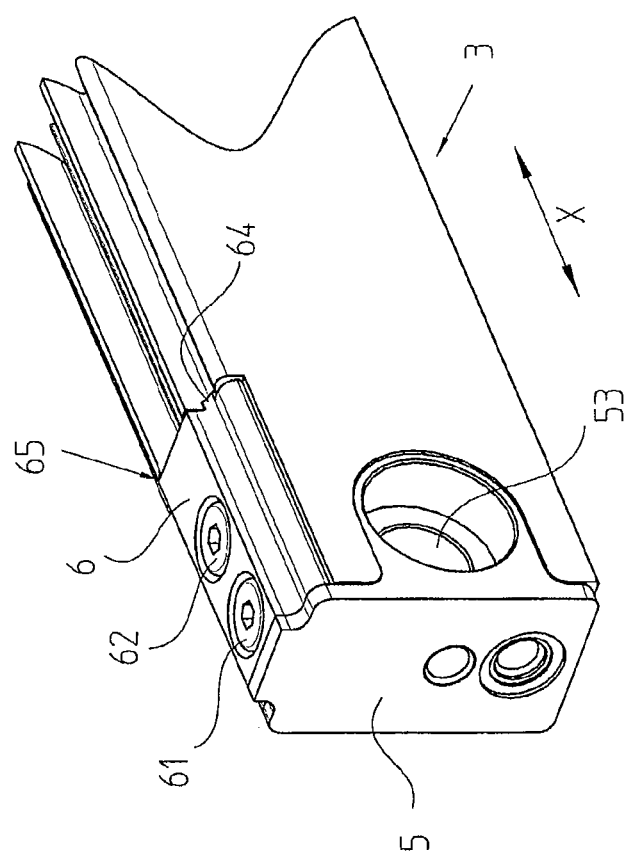
FIG. 5 is a perspective view of the length measuring instrument of FIG. 1 with the end piece fully installed.

This type of fixation can be attained in an especially space-saving way. As shown in FIGS. 2 and 5, in the fully installed state the clamping piece 6 is disposed inside the width B of the hollow profile section 3 that is predetermined by the outer sides of the two legs 34, 35. The outer dimension of the hollow profile section 3 is accordingly bounded exclusively by the two legs 34, 35. Optionally, on being mounted onto an object to be measured, the outer side of the leg 34 or of the leg 35 can be placed flat against that object, which guarantees an especially vibration-free connection.

The sealing elements 41, 42 cover the slot 33 in gable-like fashion. As can be seen from FIGS. 2-4, the insertion region 51 of the end piece 5, which is opposite these gable-like sealing elements 41, 42, likewise has a gable-like region 52, so that the sealing elements 41, 42 rest against it. The clamping piece 6 also has a corresponding recess 63. When the clamping piece 6 is placed on and firmly screwed to the insertion region 51 of the end piece 5, the sealing elements 41, 42 become clamped in place between the gable-like region 52 and the recess 63; as a result, shifting of the sealing elements 41, 42 in the longitudinal direction X is averted, and good sealing is ensured as well.

Viewed in the longitudinal direction X, the sealing elements 41, 42 are disposed between the insertion region 51 and the clamping piece 6 only within a first partial length L1 of the clamping piece 6 as shown in FIG. 4. A second partial length L2 of the clamping piece 5, adjoining the first partial length L1, is free of sealing elements 41, 42.

Because the clamping piece 6 spans the slot 33 transversely to the longitudinal direction X, it can also be used to prevent widening of the slot 33. To that end, positive engagement elements 64, 65 are disposed on the clamping piece 6. Each of these positive engagement elements 64, 65 forms a positive engagement with regions of the hollow profile section 3, which counteracts widening of the slot 33. The regions of the hollow profile section 3 with which the positive engagement elements 64, 65 cooperate are each placed between the slot 33 and one of the two legs 34, 35. By the positive engagement elements 64, 65, the two legs 34, 35 are kept stably in their predetermined position, in particular parallel to one another.

The foregoing description is provided to illustrate the present invention, and is not to be construed as a limitation. Numerous additions, substitutions and other changes can be made to the invention without departing from its scope as set forth in the appended claims.

We claim:

1. A length measuring instrument comprising:
    a hollow profile section extending in a longitudinal direction, wherein said hollow profile section comprises a slot extending in said longitudinal direction and covered by sealing elements, wherein said hollow profile section is U-shaped and wherein said hollow profile section comprises:
        two legs extending parallel to one another;
        a base joining said two legs; and
        two protrusions facing said base and disposed on said two legs; and
    a scale disposed inside said hollow profile section, wherein said scale comprises a measurement graduation which for position measurement can be scanned by a scanning unit that is movable in said longitudinal direction relative to said hollow profile section;
    an end piece connected to said hollow profile section, wherein said end piece is structured to close said hollow profile section on an end of said hollow profile section and for mounting on an object to be measured, said end piece comprising an insertion region with which said hollow profile section plunges into an interior of said hollow profile section; and
    a clamping piece that connects said end piece to said hollow profile section, wherein said clamping piece spans said slot and which on two sides of said slot fixes said hollow profile section to said insertion region of said end piece, wherein said clamping piece is screwed to said end piece, and said clamping piece presses said two protrusions against said insertion region of said end piece and affixes said two protrusions to said insertion region.

2. The length measuring instrument according to claim 1, wherein on each of said two sides of said slot, said clamping piece, together with said hollow profile section, forms a positive engagement, which counteracts widening of said slot.

3. The length measuring instrument according to claim 1, wherein said clamping piece has a width which is less than or equal to a width of said hollow profile section that is predetermined by outer sides of said two legs.

4. A length measuring instrument comprising:
a hollow profile section extending in a longitudinal direction, wherein said hollow profile section comprises a slot extending in said longitudinal direction and covered by sealing elements;
a scale disposed inside said hollow profile section, wherein said scale comprises a measurement graduation which for position measurement can be scanned by a scanning unit that is movable in said longitudinal direction relative to said hollow profile section;
an end piece connected to said hollow profile section, wherein said end piece is structured to close said hollow profile section on an end of said hollow profile section and for mounting on an object to be measured, said end piece comprising an insertion region with which said hollow profile section plunges into an interior of said hollow profile section; and
a clamping piece that connects said end piece to said hollow profile section, wherein said clamping piece spans said slot and which on two sides of said slot fixes said hollow profile section to said insertion region of said end piece, wherein said clamping piece presses said sealing elements against said insertion region of said end piece.

5. The length measuring instrument according to claim 4, wherein said sealing elements are disposed in gable-like fashion; and said insertion region facing said sealing elements is likewise shaped in gable-like fashion, and said clamping piece has a gable-like recess corresponding to that shape.

6. The length measuring instrument according to claim 5, wherein as viewed in said longitudinal direction, said sealing elements are disposed between said insertion region and said clamping piece within only a first partial length, and a second partial length of said clamping piece is free of sealing elements.

7. The length measuring instrument according to claim 4, wherein as viewed in said longitudinal direction, said sealing elements are disposed between said insertion region and said clamping piece within only a first partial length, and a second partial length of said clamping piece is free of sealing elements.

8. The length measuring instrument according to claim 4, wherein on each of said two sides of said slot, said clamping piece, together with said hollow profile section, forms a positive engagement, which counteracts widening of said slot.

9. The length measuring instrument according to claim 4, wherein said clamping piece has a width which is less than or equal to a width of said hollow profile section that is predetermined by outer sides of said two legs.

10. A length measuring system comprising:
a scanning unit; and
a length measuring instrument comprising:
a hollow profile section extending in a longitudinal direction, wherein said hollow profile section comprises a slot extending in said longitudinal direction and covered by sealing elements, wherein said hollow profile section is U-shaped and wherein said hollow profile section comprises:
two legs extending parallel to one another;
a base joining said two legs; and
two protrusions facing said base and disposed on said two legs; and
a scale disposed inside said hollow profile section, wherein said scale comprises a measurement graduation which for position measurement can be scanned by a scanning unit that is movable in said longitudinal direction relative to said hollow profile section;
an end piece connected to said hollow profile section, wherein said end piece is structured to close said hollow profile section on an end of said hollow profile section and for mounting on an object to be measured, said end piece comprising an insertion region with which said hollow profile section plunges into an interior of said hollow profile section; and
a clamping piece that connects said end piece to said hollow profile section, wherein said clamping piece spans said slot and which on two sides of said slot fixes said hollow profile section to said insertion region of said end piece, wherein said clamping piece is screwed to said end piece, and said clamping piece presses said two protrusions against said insertion region of said end piece and affixes said two protrusions to said insertion region.

11. The length measuring system according to claim 10, wherein on each of said two sides of said slot, said clamping piece, together with said hollow profile section, forms a positive engagement, which counteracts widening of said slot.

12. The length measuring system according to claim 10, wherein said clamping piece has a width which is less than or equal to a width of said hollow profile section that is predetermined by outer sides of said two legs.

13. A length measuring system comprising:
a scanning unit; and
a length measuring instrument comprising:
a hollow profile section extending in a longitudinal direction, wherein said hollow profile section comprises a slot extending in said longitudinal direction and covered by sealing elements;
a scale disposed inside said hollow profile section, wherein said scale comprises a measurement graduation which for position measurement can be scanned by a scanning unit that is movable in said longitudinal direction relative to said hollow profile section;
an end piece connected to said hollow profile section, wherein said end piece is structured to close said hollow profile section on an end of said hollow profile section and for mounting on an object to be measured, said end piece comprising an insertion region with which said hollow profile section plunges into an interior of said hollow profile section; and
a clamping piece that connects said end piece to said hollow profile section, wherein said clamping piece spans said slot and which on two sides of said slot fixes said hollow profile section to said insertion region of said end piece, wherein said clamping piece presses said sealing elements against said insertion region of said end piece.

14. The length measuring system according to claim 13, wherein said sealing elements are disposed in gable-like fashion; and said insertion region facing said sealing elements is likewise shaped in gable-like fashion, and said clamping piece has a gable-like recess corresponding to that shape.

15. The length measuring system according to claim 14, wherein as viewed in said longitudinal direction, said sealing elements are disposed between said insertion region and said clamping piece within only a first partial length, and a second partial length of said clamping piece is free of sealing elements.

16. The length measuring system according to claim 13, wherein as viewed in said longitudinal direction, said sealing elements are disposed between said insertion region and said clamping piece within only a first partial length, and a second partial length of said clamping piece is free of sealing elements.

17. The length measuring system according to claim 13, wherein on each of said two sides of said slot, said clamping piece, together with said hollow profile section, forms a positive engagement, which counteracts widening of said slot.

18. The length measuring system according to claim 13, wherein said clamping piece has a width which is less than or equal to a width of said hollow profile section that is predetermined by outer sides of said two legs.

* * * * *